Nov. 16, 1943.   F. BURDICK   2,334,244
FISHING REEL
Filed May 31, 1941
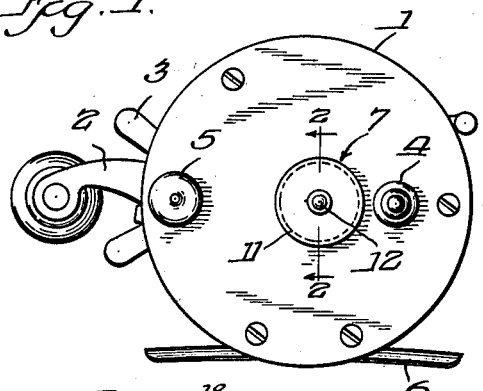
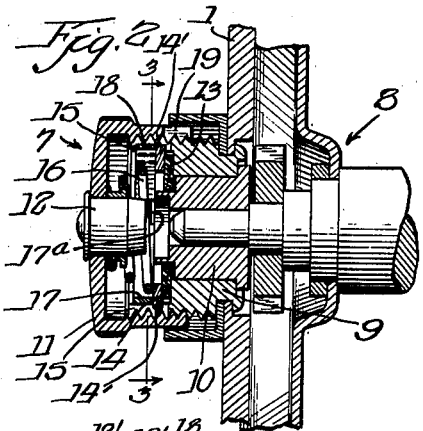
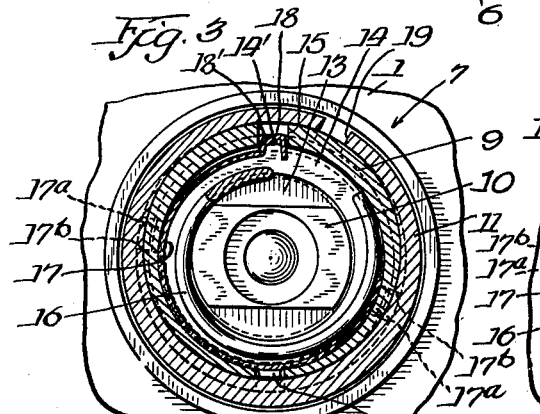
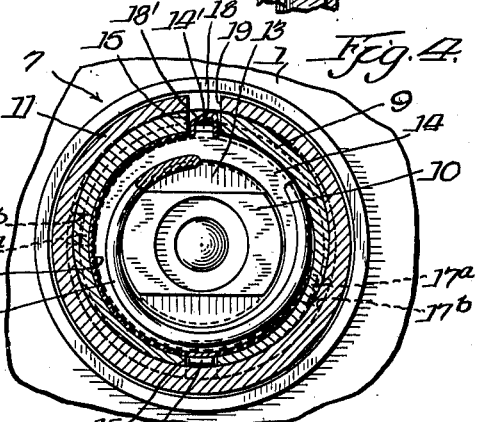
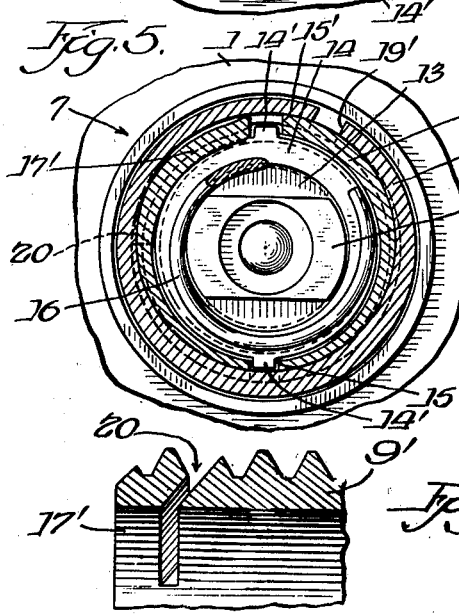
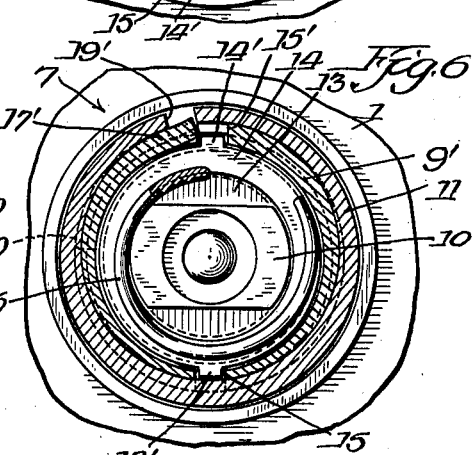
Inventor:
Frank Burdick
By W. F. Kellogg
Atty.

Patented Nov. 16, 1943

2,334,244

UNITED STATES PATENT OFFICE 2,334,244

FISHING REEL

Frank Burdick, Kalamazoo, Mich., assignor to Shakespeare Company, Kalamazoo, Mich., a corporation of Michigan Application May 31, 1941, Serial No. 396,059

7 Claims. (Cl. 151—9)

This invention relates to improvements in fishing reels, more particularly, to a spool cap lock. The principal object of the invention resides in the provision of a simple and durable means for use in connection with the spool frictional drags of fishing reels to prevent loss of vital adjusting parts thereof, especially in those types of reels used in heavy fishing, more generally identified as salt water fishing, where the loss of such parts is quite apt to result in loss of fish and, frequently, the mental equilibrium of the fisherman; consequently, the loss of trade good will by the tackle manufacturer.

More particularly, it is an object of the invention to provide a fishing reel frictional drag assembly with a lock, operative at a predetermined time, whereby the cap of an equipped drag assembly bushing will be positively prevented from becoming accidentally or undesirably disengaged therefrom and yet, will allow full and effectual range of adjustment of such cap upon the bushing for causing selective modulation of the character of rotation of the reel spool.

Other objects will be in part obvious and in part pointed out hereinafter.

In order that the invention and its mode of operation may be readily understood by those skilled in the art to which it appertains, I have, in the accompanying drawing and the detailed description based thereupon, set out several embodiments of my invention.

In this drawing:

Figure 1 is a side elevation of a reel equipped with the invention.

Figure 2 is an enlarged fragmentary vertical transverse section taken on the line 2—2 of Figure 1, looking in the direction in which the arrows point.

Figure 3 is an enlarged section taken on the line 3—3 of Figure 2, looking in the direction in which the arrows point, showing the lock spring in an inoperative position with respect to the spool cap.

Figure 4 is a similar view showing the lock spring in operative or engaged position with relation to the spool cap, whereby to prevent rotation of the same in a direction to bring about its disengagement from the drag assembly bushing.

Figure 5 is an enlarged fragmentary section corresponding to Figure 3, illustrating a modified form of lock spring wherein the latter is an integral part of the drag assembly bushing; such modified lock spring being shown in an inoperative position with respect to the spool cap.

Figure 6 is a view corresponding to Figure 5, wherein the integral lock spring is shown in operative or engaged position with the spool cap for locking same against further rotation in a certain direction; and Figure 7 is an enlarged longitudinal section through a portion of the drag assembly bushing showing an angular style of slotting the drag assembly bushing forming the integral spool cap locking spring shown in Figures 5 and 6.

Having more particular reference to the drawing in connection with which like characters of reference will designate corresponding parts throughout, I have chosen to illustrate my invention applied to a salt water or heavy duty type of reel construction. It will be understood, however, that adaptation of the invention may be effected to any type of reel employing frictional drag means and especially reel spool drag means, as well as to cap provided reel bushings in general. In the illustrated application of the invention, the reel tail plate is designated by the numeral 1; the reel crank, by the numeral 2; the gear drag star, by the numeral 3; the usual click button, by the numeral 4; the line carriage tail bushing, by the numeral 5 and the cross plate, by the numeral 6.

A spool frictional drag assembly, generally identified by the numeral 7, is provided the tail plate 1 for controlling the character of rotation of the spool assembly, fragmentarily illustrated in Figure 2 and generally identified by the numeral 8. This frictional spool drag assembly includes an externally screw-threaded spool bushing 9, rotatably receiving a spool pivot 10, fixedly mounted upon one of the pintles of the reel spool, and as will be noted upon reference to Figure 2, is provided with a spool cap 11 having adjustable screw-threaded engagement with the bushing 9; said cap, if desired, having a suitable oil cup 12 engaged with and through the same. Contacting friction washers 13 and 14 are arranged in the bushing 9, the former engaging the outer end of the spool pivot 10 and the latter being provided with diametrically opposed, outwardly extending fingers 14′ slidably received in correspondingly arranged slots or ways 15 disposed longitudinally of the bushing 9. Frictional interengagement between the washers 13 and 14 is normally urged by a helical spring 16 arranged in the spool cap 11 and having adjustable or variable bearing upon the adjacent friction washer 14. Thus, with rotation of the spool cap 11 on the bushing 9, the character of rotation of the spool assembly 8 may be adjusted, as desired or required, i. e., it may be adjusted to effectually retard rotation or to permit of freer rotation of the spool assembly.

As stated immediately above, to increase or decrease application of frictional drag to the spool assembly 8, the spool cap 11 is rotated in either clockwise or counterclockwise directions. When it is rotated counterclockwise, frictional drag of the assembly 7 will be accordingly decreased. During such drag decreasing adjustment of the cap 11, a fisherman, heretofore, was required to exercise care to the extent that he did not undesirably or accidentally disengage the screw-threaded cap 11 from the screw-threads of the bushing 9, else loss of vital operating parts of the drag assembly would be apt to occur along with the effecting of considerable annoyance to such fisherman. In order to eliminate these objectionable circumstances, I snugly engage a semi-circularly shaped lock spring 17 within the bushing 9 outwardly of and in juxtaposed relation to the friction washer 14. A pawl or catch element 18 is formed upon one end of the lock spring 17 and has its outer face beveled as at 18', the purpose of which will be subsequently apparent. The catch 18 is engaged in one of the diametrically opposed longitudinal ways 15 in the bushing 9, as shown in Figures 3 and 4 of the accompanying drawing and at times, is adapted to be engaged in a marginally opening way 19 formed in a portion of the side wall of the cap 11, as shown in the Figure 4. At this point, attention is invited to the fact that the way 19 provided in the side of the spool cap 11, extends for but a comparatively short distance therein. In consequence, with counterclockwise rotation of the cap, the way 19 will not be brought into longitudinal registration with the pawl 18 of the lock spring 17 until said cap has been turned to its near limit of outward movement upon the bushing 9, before becoming disengaged therefrom, with the result that the cap may be turned upon or from the bushing 9 so as to permit of full range of adjustment of the frictional drag assembly parts. When, however, the spool cap is rotated to a point where the way 19 is brought into registering relationship with the pawl 18, it will be immediately moved thereinto, under urge of the lock spring 17, hence, positively preventing further counterclockwise rotation of the spool cap, consequently, preventing undesired disengagement of said cap from the bushing 9. Because of the beveled outer face formation 18' of the pawl 18, it will be seen that the spool cap 11 may be rotated without interference in a clockwise direction upon the bushing to effect operation of the frictional spool drag assembly in an entirely satisfactory manner. To disengage the spool cap 11 from the bushing 9, it is only necessary that the pawl 18 be inwardly disengaged from the way 19 of the cap, hence, permitting continued counterclockwise rotation of the spool cap in order that it may be completely turned from engagement with the screw-threaded bushing 9.

It is preferable that the semi-circularly shaped lock spring 17 shall have one ore more right angularly disposed fingers 17ª formed or otherwise provided upon the normally inner marginal portion thereof adapted to be received in circumferential disposed slots or ways 17ᵇ formed in appropriate or adjacent portions of the bushing 9. Thus, it will be understood that said lock spring 17 will be anchored or retained within the bushing 9 so that its pawl or catch element 18 will remain in engagement with the particular bushing provided slot 15 receiving the same, and too, that the lock spring will be prevented from having longitudinal shifting movement in or with respect to the bushing 9. Obviously, the manner in which these fingers 17ª are engaged in the slots 17ᵇ will not interfere with flexing movement of the lock spring 17 and by consequence, the pawl 18.

In Figures 5, 6 and 7, I have shown a modified form of lock spring, so constructed as to be an integral part of the spool bushing. To effect this, an acutely angular saw-cut 20 is made transversely of a portion of the screw-threaded bushing 9', preferably in proximity to the normally outer end thereof. This cut opens onto a side of one of the longitudinal slots 15' formed in the bushing 9' for slidably receiving the outwardly extending fingers 14' of the frictional washer 14 and thus, constitutes an integral lock spring element 17', the outer end portion of which is disposed radially outwardly of the body of the bushing 9'. Hence, with turning of the spool cap 11'' onto the screw-threaded bushing 9' in a clockwise or counterclockwise direction, the cap may be adjusted to any desired position for effecting adjustment of the frictional drag parts of the assembly 7 to either retard rotation or permit of freer rotation of the equipped spool assembly. However, when the spool cap 11' is rotated in a counterclockwise direction to a point where its marginally opening way 19' registers with the normally outwardly thrust free end of the integral lock spring 17', said free end will immediately engage in the way 19', as shown in Figure 6, and thus, prevent further continued counterclockwise rotation of the cap. Therefore, undesirable or accidental disengagement of the cap from its bushing will be prevented, though if desired, the engaging or pawl-like end of the spring lock 17' may be depressed so as to be disengaged from within the way 19', allowing the cap to be turned for disengagement from the bushing. Because of the normal disposition of the pawl-like or free end of the integral lock spring 17', it will be understood that the cap 11' may be clockwise turned into screw-threaded engagement with the bushing 9' and that during such clockwise rotation, the way 19' will be allowed to freely ride over and by the pawl-like end of the lock spring 17'.

The saw-cut or slot 20 in the bushing 9', by means of which the integral lock spring 17' is formed, as hereinbefore stated, is preferably milled at such an angle that when the integral lock spring element 17' is depressed to unlock or free the spool cap 11 for rotation, said integral lock spring can be only depressed for a limited inward distance—i. e., it will be only flexed inwardly enough to effect such unlocking movement, and that, without destroying its efficiency as a spring lock by its inward flexing and setting beyond the inner periphery of the bushing 9'. The degree at which the cut or slot 20 is formed or milled may vary, though the particular angle thereof should be such that there will be relative overlapping arrangement between the adjacent sides of the integral lock spring 17' and the bushing 9'.

I claim:

1. A cap lock, including a bushing having a longitudinally disposed way formed in a portion of its side in proximity to its outer marginal portion, a cap rotatably engaged over the bushing having a marginally opening longitudinally disposed way formed in a portion of its side, a curved spring element received in the bushing, and a catch on one end of the spring element, normally engaged in the way in said bushing and engageable, at times, in the way in said cap.

2. A cap lock, including a bushing having an outwardly opening longitudinally disposed way formed in a portion of its side, a cap rotatably engaged over the bushing having a marginally opening longitudinally disposed way formed in a portion of its side, a curved spring element having a substantially flat outer side received in the bushing, and a catch on one end of the spring element, normally engaged in the way in said bushing and engageable, at times, in the way in said cap.

3. A cap lock, including a bushing having a longitudinally disposed way formed in a portion of its side adjacent its outer end, a cap rotatably engaged over the bushing having a longitudinally disposed way formed in a portion of its side adjacent its normally inner marginal portion, a curved spring element received within the bushing, and a cross-sectionally substantially U-shaped catch on one end of spring element normally engaged in the way in said bushing and engageable, at times, in the way in said cap.

4. A cap lock, including a bushing having a longitudinally disposed way formed in a portion of its side, a cap rotatably engaged over the bushing having a longitudinally disposed way formed in a portion of its side, a curved spring element received within the bushing, and a cross-sectionally substantially U-shaped catch on one end of the spring element, having one of its sides bevelled and its opposite side substantially right-angularly shouldered, said catch being normally engaged in the way in said bushing and engageable, at times, in the way in said cap.

5. A cap lock, including a bushing having a longitudinally disposed way formed in a portion of its side adjacent its outer end, a cap rotatably engaged over the bushing having a longitudinally disposed way formed in a portion of its side adjacent its normally inner marginal portion, a spring element in the bushing, and a catch on one end of the spring element having one of its sides bevelled and its opposite side substantially right-angularly formed, said catch normally engaging in the way in said bushing and engageable, at times, in the way in said cap.

6. A cap lock, including a bushing having a longitudinally disposed way formed in a portion of its side adjacent its outer end, a cap rotatably engaged over the bushing having a longitudinally disposed way formed in a portion of its side adjacent its normally inner marginal portion, and a spring actuated catch anchored within said bushing engaged in the way therein and engageable, at times, in the way in said cap.

7. A cap lock, including a bushing having a longitudinally disposed way formed in a portion of its side adjacent its outer end, a cap rotatably engaged over the bushing having a longitudinally disposed way formed in a portion of its side adjacent its normally inner marginal portion, and an outwardly movable catch anchored within said bushing having one of its sides bevelled and its opposite side substantially right-angularly shouldered, said catch being normally engaged in the way in said bushing and engageable, at times, in the way in said cap.

FRANK BURDICK.